United States Patent
Rumbaut et al.

(10) Patent No.: US 8,329,242 B2
(45) Date of Patent: Dec. 11, 2012

(54) PROCESS FOR MAKING CHOCOLATE

(75) Inventors: Luc Joseph Paul Antonie Marie Rumbaut, Wieze (BE); Rik Jan Theo Weetjens, Melle (BE)

(73) Assignee: Barry Callebaut AG, Zurich (CH)

( * ) Notice: Subject to any disclaimer, the term of this patent is extended or adjusted under 35 U.S.C. 154(b) by 294 days.

(21) Appl. No.: 12/669,930

(22) PCT Filed: Jul. 17, 2008

(86) PCT No.: PCT/EP2008/005857
§ 371 (c)(1),
(2), (4) Date: Jan. 20, 2010

(87) PCT Pub. No.: WO2009/012929
PCT Pub. Date: Jan. 29, 2009

(65) Prior Publication Data
US 2010/0203221 A1 Aug. 12, 2010

(30) Foreign Application Priority Data
Jul. 21, 2007 (GB) .................................... 0714390.2

(51) Int. Cl.
*A23G 1/00* (2006.01)
(52) U.S. Cl. ........................ 426/631; 426/519
(58) Field of Classification Search .................. 426/631, 426/519
See application file for complete search history.

(56) References Cited

U.S. PATENT DOCUMENTS

| | | | |
|---|---|---|---|
| 2,356,181 A | 8/1944 | Ruben | |
| 2,399,195 A | 4/1946 | Bodenheim | |
| 2,850,388 A | 9/1958 | Peebles et al. | |
| 3,663,231 A * | 5/1972 | Tourell | 99/485 |
| 3,764,079 A | 10/1973 | Consoli | |
| 4,017,645 A | 4/1977 | Ziccarelli | |
| 4,151,308 A | 4/1979 | Ziccarelli et al. | |
| 4,156,743 A * | 5/1979 | Schmitt | 426/631 |
| 4,440,797 A | 4/1984 | Berkes et al. | 426/613 |
| 4,679,498 A * | 7/1987 | Chaveron et al. | 99/483 |
| 5,051,265 A | 9/1991 | Meister et al. | |
| 5,215,771 A * | 6/1993 | Callebaut et al. | 426/231 |
| 5,320,427 A * | 6/1994 | Callebaut et al. | 366/151.1 |
| 5,554,409 A * | 9/1996 | Vezzani | 426/631 |
| 5,676,995 A * | 10/1997 | Cully et al. | 426/660 |
| 5,709,903 A | 1/1998 | St. John et al. | |
| 5,945,150 A | 8/1999 | Lipp | |
| 5,989,610 A | 11/1999 | Ruzek | |

(Continued)

FOREIGN PATENT DOCUMENTS

DE 37 35 087 6/1988

(Continued)

OTHER PUBLICATIONS

Beckett, S.T., "Industrial Chocolate Manufacture and Use," Blackie Academic & Professional: Glasgow, pp. 338-341, (1987).

(Continued)

*Primary Examiner* — Carolyn Paden
(74) *Attorney, Agent, or Firm* — Hoxie & Associates, LLC

(57) ABSTRACT

A process for producing a chocolate or chocolate-like product comprises: (i) mixing a part of the components of the chocolate or chocolate-like product to form a mixture; (ii) homogenizing the mixture with fat using a rotor/stator homogenizer; and (iii) conching the homogenized mixture.

24 Claims, 2 Drawing Sheets

U.S. PATENT DOCUMENTS

| | | | |
|---|---|---|---|
| 5,989,619 | A | 11/1999 | Zumbe et al. |
| 6,221,422 | B1 | 4/2001 | Kruger et al. |
| 6,582,747 | B2 | 6/2003 | Myers et al. |
| 7,736,685 | B2 * | 6/2010 | Parsons et al. ............... 426/631 |
| 2001/0012536 | A1 | 8/2001 | Armstrong et al. |
| 2003/0118708 | A1 | 6/2003 | Kaiser et al. |
| 2005/0175765 | A1 | 8/2005 | Zaki |
| 2006/0117965 | A1 | 6/2006 | Parsons et al. |
| 2006/0121175 | A1 | 6/2006 | Hanselmann |
| 2006/0147584 | A1 | 7/2006 | Robert |
| 2006/0222753 | A1 | 10/2006 | Harshberger |

FOREIGN PATENT DOCUMENTS

| | | | |
|---|---|---|---|
| DE | A-4313149 | | 10/1994 |
| EP | A-940085 | | 9/1999 |
| EP | 0997076 | * | 3/2000 |
| EP | A-0997076 | | 5/2000 |
| EP | B-1165239 | | 1/2002 |
| EP | 1 358 804 | | 11/2003 |
| EP | 1 733 625 | | 12/2006 |
| GB | 1578986 | | 11/1980 |
| GB | 2066642 | | 7/1981 |
| GB | 2297760 | | 8/1996 |
| HU | 42925 | | 9/1987 |
| JP | 62253341 | | 11/1987 |
| WO | WO 96/034535 | | 11/1996 |
| WO | WO 99/038390 | | 8/1999 |
| WO | WO 02/087351 | | 11/2002 |
| WO | WO 03/059094 | | 7/2003 |
| WO | WO 2004/000028 | | 12/2003 |
| WO | WO 2005/077197 | | 8/2005 |

OTHER PUBLICATIONS

Simon, E.J., "Zerkleinerung bei der schokoladen-herstellung—getrennte oder gemeinsame vermahlung?" *Rev. Int. Choc.*, vol. 24, No. 4, pp. 140-155, (1969).

Bolenz, S. et al., Pre-dried refiner flakes allow very short or even continuous conching of milk chocolate, *Eur Food Res Technol*, 2007, vol. 226, No. 2-2, pp. 153-160.

Niediek, E.A., et al., Ube rein verbessertes Milchschokolademasseherstellungsverfahren, Süsswaren, 3, 1971, pp. 91-96.

Reudenbach, R., Prallzerkleinerung in der Kakao- und Schokoladenindustrie, Kakao + Zucker, pp. 459-464 (Oct. 1973).

* cited by examiner

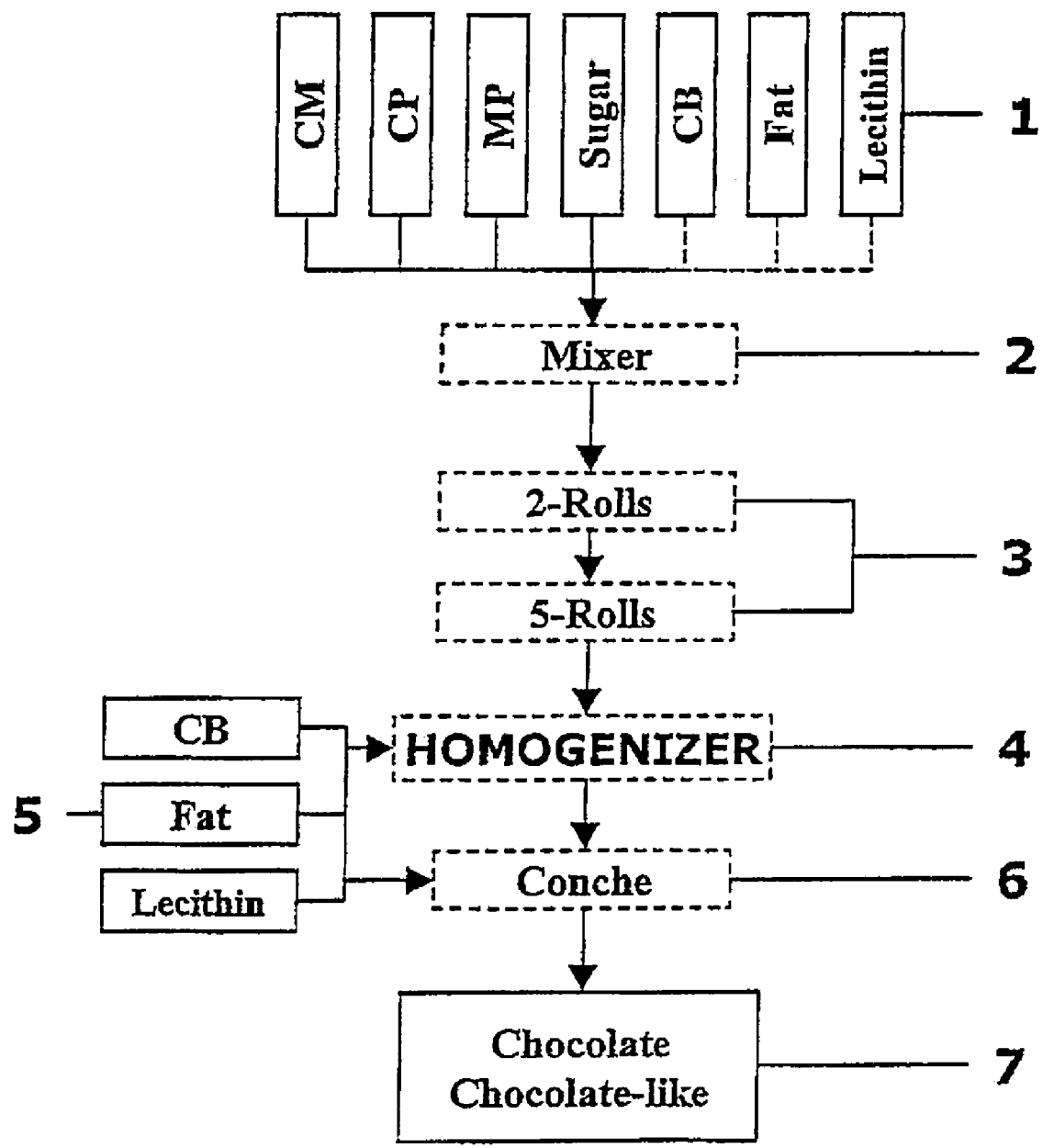

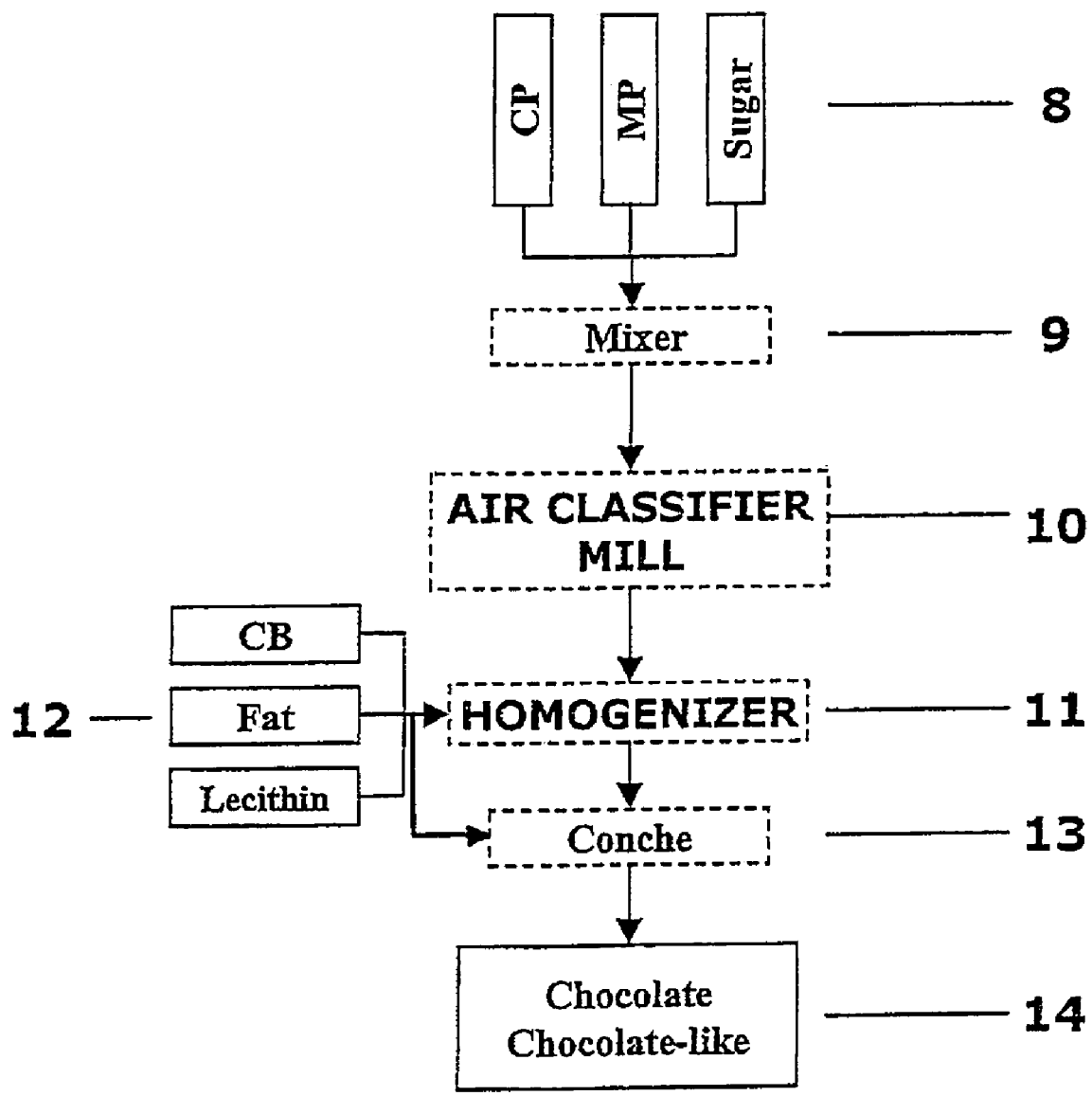

PROCESS FOR MAKING CHOCOLATE

CROSS REFERENCE TO RELATED APPLICATIONS

This application is a U.S. National Stage Application under 35 USC §371 of PCT/EP2008/005857, filed Jul. 17, 2008, which claims the benefit of GB Application No. 0714390.2, filed Jul. 21, 2007 the contents of each of which are incorporated herein by reference.

This invention relates to a process for producing chocolate or a chocolate-like product and to the chocolate or chocolate-like product thereby produced.

Many processes are known for producing chocolate and chocolate-like products. Chocolate-like products are materials in which at least a part of the cocoa butter in chocolate is replaced by another fat, such as butterfat or a vegetable fat such as a cocoa butter equivalent (CBE). Processes for producing chocolate and chocolate-like products typically involve dispersing finely ground powders in a fat phase. The finely ground powders may include, for example, cocoa solids, sugar and optionally milk solids. The ingredients that are used are dictated by the nature of the product. Plain chocolate contains cocoa solids but generally does not contain non-fat milk solids, whereas milk chocolate does contain non-fat milk solids and milk fat as additional ingredients. White chocolate is prepared without the addition of cocoa mass or cocoa powder. The fat used to produce the chocolate is typically cocoa butter, optionally at least partly replaced by another fat in chocolate-like products.

In the traditional method for producing chocolate and chocolate-like products, the ingredients are mixed and ground in a refiner or mill to reduce the particle size of the solids. The resulting paste is then conched. Conching is a flavour-developing step which involves the intimate mixing or kneading of the chocolate ingredients and is traditionally carried out at elevated temperatures. During conching, the flavour of the product develops and the desired viscosity is obtained. Typically, the free acid and water content of the chocolate are reduced during conching. Conching is a time-consuming step in the process and typically takes from a few hours to a few days, depending on the product and the equipment used. After conching, the product may be cooled and optionally tempered.

Conching is generally regarded as an essential step in the process in order to develop the flavour and lower the viscosity of the product. However, because it involves maintaining the product at an elevated temperature for a relatively long time, it is energy intensive.

A method and device for producing chocolate with a shortened conching time, or with no conching step, is described in WO 2004/000028. The device uses a premixer which delivers chocolate flakes to a gear pump. The gear pump extrudes the product through small holes in a die plate and the resulting mixture is passed to a pin mixer for homogenization.

U.S. Pat. No. 4,679,498 describes an extrusion process for preparing a chocolate paste.

U.S. Pat. No. 5,945,150 discloses a process for manufacturing chocolate in which a paste is milled and conched before being transferred to a high shear mixer for final liquefaction of the chocolate paste.

Niediek, Süsswaren, 3, 1971, 91-96 discloses a process for making milk chocolate. Reudenbach, Kakao+Zucker, 10, 1973, 459-464 describes a process for producing a milk chocolate.

EP-A-0997076 relates to a method for making chocolate that includes a refining step, which involves a latter stage of applying shear in the range of about 200,000 to 1,000,000 sec$^{-1}$.

There remains a need for processes for making chocolate that can reduce conching times. It would also be advantageous to avoid the need for expensive, energy-intensive steps in the process such as those involving extrusion.

According to the invention, there is provided a process for producing a chocolate or chocolate-like product comprising:
 (i) mixing a part of the components of the chocolate or chocolate-like product to form a mixture;
 (ii) homogenizing the mixture with fat using a rotor/stator homogenizer; and
 (iii) conching the homogenized mixture.

Also provided by the invention are chocolate and chocolate-like products made according to the process of the invention.

BRIEF DESCRIPTION OF THE DRAWINGS

FIG. 1 is a flow diagram schematically showing a process according to the invention; and
FIG. 2 is a flow diagram schematically showing a process according to the invention that employs an air classifier mill.

DETAILED DESCRIPTION OF THE INVENTION

It has been found according to the invention that it is advantageous to use a rotor/stator homogenizer prior to conching. A high shear mixer had been used after conching, as described in U.S. Pat. No. 5,945,150, but had not been thought to be useful prior to conching. Process conditions and the requirements of the mixture prior to conching are very different from those after conching. For example, prior to conching, the chocolate ingredients form a paste, whereas after conching they are liquid. Conching has to be performed on a mixture that is a paste i.e., it is neither a dry powder nor a liquid. Otherwise, the conching will be ineffective. Also, prior to conching, particularly when using chocolate flake, it is important to control increases in temperature. This is because prior to conching the water content of the mixture is relatively high and, at high water contents, too high a temperature can cause lactose, which is present in amorphous form, to crystallise and form undesirably large grains. These latter problems do not exist when the water content is reduced during conching.

The device disclosed in WO 2004/000028 would not be effective to provide a material for conching because the output of the pin mixer is a liquid, not a paste, is unsuitable for dry conching and could only be further liquefied.

The process of the invention has the advantage that the time taken for conching can be reduced and that the mixture can be at least partially heated (by mechanical forces in the homogenizer) before being transferred to the conch. The process of the invention has the further advantages that fat and powder can be introduced prior to conching.

The process of the invention preferably does not involve a step of extrusion, for example of a component, of a mixture or of a product during the process.

The first step of the process involves the formation of a mixture comprising part of the components of the chocolate or chocolate-like product. By "part of the components", it is meant that not all of the components of the final chocolate product are present i.e., not all of the components of the final chocolate or chocolate-like product may have been included and/or the components may not have been added in the amounts that are present in the final product.

Typically, the components include cocoa based materials, sugars, sugar substitutes, milk powders, fat and mixtures thereof. Preferably, the cocoa based materials are cocoa powder, cocoa mass, cocoa liquor and mixtures thereof. Milk powders include, for example, skimmed milk powder, whey powder and derivatives thereof, full cream milk powder and mixtures thereof. Suitable sugars include sucrose, fructose, glucose and dextrose and mixtures thereof. Sugar substitutes preferably include inulin, dextrin, isomaltulose, polydextrose and maltitol and mixtures thereof.

Preferably, the mixture that is formed in (i) comprises at least two of cocoa powder, milk powder, and sugar. Cocoa powder and sugar are used for producing dark chocolate. Cocoa powder, milk powder and sugar are used to produce milk chocolate. Milk powder and sugar are used to produce white chocolate. Preferably, the mixture that is formed in (i) comprises cocoa powder, sugar and optionally milk powder. These components are more preferably present in the same amount as in the final chocolate product i.e., no more of these components is added at a later stage of the process. Optionally, one or more of cocoa butter, fat and an emulsifier such as lecithin are included in the mixture that is formed in (i) but in smaller amounts than are present in the final chocolate product. This ensures that the mixture has the correct consistency.

Preferably, the mixture formed in (i) is refined prior to homogenizing. During refining, the particle size of the solids present in the mixture is reduced. Advantageously, the mixture prior to homogenizing comprises solids having a size of less than 80 µm, for example less than 50 µm, such as a particle size in the range of from 5 to 80 µm, preferably from 10 to 50 µm, most preferably from 15 to 25 µm. Particle sizes may be determined by the method described in the Examples section below.

The process for refining the mixture preferably comprises the step of refining using a 5-roller mill. Apparatus for carrying out this step is well known in the art.

The refining process may be a single step but, in one embodiment, may be a two stage refining step. The two stage refining step preferably comprises a first stage comprising refining using a 2-roller mill and a second stage comprising refining using a 5-roller mill.

In addition to refining using a 5-roller mill and optionally a 2-roller mill, or preferably as an alternative, the mixture may be dry milled, for example by milling in an air classifier mill. More preferably, the air classifier mill is a radial classifier having an air purge system. Air classifier mills that can be used in the invention are commercially available. Suitable apparatus is available from, for example, P. M. Duyvis Machinefabriek BV, The Netherlands.

Dry milling of the components, for example in an air classifier mill, has the advantage that the fat need not be added until a later stage of the process and so allows a potential reduction in the fat content of the final chocolate or chocolate-like product. The term dry is not intended to signify the complete absence of water but to indicate that the milling is performed on a powder in the absence of a liquid medium, typically in the absence of liquid fat. This will be well known to those skilled in the art. During milling, the particle size of the solids present in the mixture is reduced. Dry milling or dry mixing of the components is therefore a preferred aspect of the invention.

When the process of the invention involves dry milling, the level of fat that is present in (i) is preferably less than 22% by weight, more preferably less than 12% by weight, even more preferably from 0.1 to 4% by weight based on the weight of the mixture in (i).

The weight ratio of (fat present in (i)):(fat added in (ii)):(fat added in (iii)), based on the total fat in the product, in the process of the invention, particularly when it comprises a step of dry milling, is preferably from (0 to 6):(50 to 90):(10 to 50), more preferably from (1 to 5):(75 to 84):(15 to 25). Thus, less fat is present in the earlier stages of the process.

In another embodiment, the weight ratio of (fat present in (i)):(fat added in (ii)):(fat added in (iii)), based on the weight of the total fat in the product, is from (6 to 35):(50 to 90):(10 to 50).

The process of the invention may be used to produce milk, dark or white chocolate or chocolate-like product.

Preferred cocoa solids that may be used in the process comprising dry milling comprise cocoa powders, expeller flake and mixtures thereof.

In step (ii) of the process of the invention, the mixture is homogenized with fat using a rotor/stator homogenizer. The fat can be partly from the components of the mixture but preferably includes added fat. The added fat may represent less than 10% by weight of the fat in the mixture during homogenization, particularly when dry milling is not employed. In the process involving dry milling, the level of added fat will generally be greater than this.

The homogenizer preferably produces a homogenized mixture that is suitable for conching. Thus, the homogenized mixture may be directly conched without intervening steps such as refining.

The fat is preferably added after step (i) and before or during homogenization in step (ii). Preferably, the fat is selected from the group consisting of cocoa butter, cocoa butter equivalents, butter fat or fractions thereof, palm oil or fractions thereof, coconut or fractions thereof, palm kernel oil or fractions thereof, liquid oils (for example, sunflower oil and/or rapeseed oil), interesterified mixtures of the above fats or fractions or hardened components thereof, or mixtures of one or more of these, such as a mixture of cocoa butter and a palm oil fraction.

Other components of the final product may be added to the mixture after step (i) and before or during homogenization in step (ii). Emulsifiers, such as lecithin, are preferably added, for example.

During homogenization, the temperature advantageously rises due to the mechanical action of the homogenizer on the mixture. This is advantageous because it allows thorough heating of the mixture directly into the mixture itself (rather than via an outside surface of a container for the mixture) and since it reduces the time taken and/or energy needed to reach the conching temperature. The homogenizing step is preferably carried out such that a temperature rise of at least 10° C., preferably a rise between 20 and 60° C. most preferably a rise between 40 and 50° C. is achieved in the mixture by mechanical input.

Preferably, the homogenizing step is carried out such that the reduction in the particle size during homogenization is less than 25%, more preferably less than 10%. Most preferably, the homogenizing step is carried out such that the particle size does not change significantly (or at all) during the homogenization step. This means that the particle size of the solids in the final product is dictated solely by the refining step(s).

A preferred rotor/stator homogenizer for use in the invention is preferably as described in DE-A-4313149 (Imcatec GmbH; Lipp), the contents of which are incorporated herein by reference. The homogenizer is available commercially from Lipp Mischtechnik GmbH, Mannheim, Germany under the trade name Reflector®. The preferred rotor/stator homogenizer comprises a single-shaft inline mixer which works on the rotor/stator principle. Axially arranged rotor blades intermesh with the toothed rings of the stator. The toothed rings of the stator are preferably peripherally arranged. The toothed rings of the stator together with the ends of the rotors form a shearing zone. The homogenizer preferably comprises a hopper for adding the mixture and a conveying screw for delivering the mixture from the hopper to the rotor/stator elements.

Preferably, homogenization is carried out to give a mixture with a hardness similar to the hardness resulting from the shear after at least two hours of traditional conching in a double or single shaft conche. More preferably, homogenization is carried out such that the mixture that is produced, at the temperature at which it leaves the homogenizer, has a penetration value measured with a manual gravity cone penetrometer in the range of from about 5 mm to about 20 mm, more preferably from about 9 mm to about 12 mm. The method for determining penetration values is described in the Examples part of this specification.

Step (iii) in the process of the invention involves conching of the homogenized mixture. Preferably, the conching is carried out using a three shaft shear conch or a one shaft plough shear conch. Typically, the conching is carried out at temperature between 50 and 100° C., more preferably from 60 to 90° C. The conching step may be carried out for less than 8 hours, preferably for from 4 to 6 hours.

Ingredients such as one or more fats and emulsifiers may optionally be added after step (ii) and before or during conching. Preferably, fat and/or emulsifiers and/or flavouring agents are added to the mixture in the conch. Fats that are preferably added to the conch are selected from the group consisting of cocoa butter, cocoa butter equivalents, butter fat or fractions thereof, palm oil or fractions thereof, coconut or fractions thereof, palm kernel oil or fractions thereof, liquid oils (for example, sunflower oil and/or rapeseed oil), interesterified mixtures of the above fats or fractions or hardened components thereof; or mixtures thereof. The emulsifiers that are preferably added to the conch are selected from the group consisting of lecithin, fractionated lecithin and PGPR or mixtures thereof. Flavouring agents that may be added to the conch are selected from the group consisting of vanilla and caramel or mixtures thereof.

Preferably, when the process of the invention does not comprise a step of dry refining such as dry milling, the weight ratio of fat present in the steps (i):(ii):(iii) is (70 to 100):(80 to 100):(90 to 100), based on the weight of the fat in the product.

After conching, the liquid chocolate or chocolate-like product is cooled, typically after forming into a desired shape. The chocolate or chocolate-like product may comprise one or more food additives that are added prior to cooling, such as biscuit, nuts (whole or pieces), crispies, sponge, wafer or fruit, such as cherries, ginger and raisins or other dried fruit. These additives are normally embedded in the chocolate or chocolate-like product in the final product.

The chocolate or chocolate-like product of the invention may take any suitable form and may, for example, be packaged and sold as a block or a bar. Alternatively or additionally, the chocolate or chocolate-like product of the invention may optionally be filled and may be used as a coating. For example, the chocolate or chocolate-like product may be used in other confectionery and bakery applications, for example as a cake coating or filling, a biscuit coating or filling, a sponge coating or filling or a coating layer for an ice cream.

The chocolate or chocolate-like product of the invention may optionally have further additives added prior to the final use of the product. For example, the fat content may be increased to from 35% to 50% (such as about 45%) by weight by adding fat to the chocolate or chocolate-like product prior to use as an ice cream coating.

The chocolate or chocolate-like product may be used in applications comprising, for example, one or more of moulding, enrobing, dipping, bottoming, filling and panning.

Chocolate-like products include fat-continuous confectionery fillings. Fillings preferably comprise fat, sugar and optionally one or more of dairy powder (including milk powder and/or yoghurt powder), and flavouring agents. Suitable flavouring agents include, but are not limited to, fruit, nut, and vanilla flavourings, fruit powder and pieces, nuts, vanilla, herbs (e.g., mint), herb flavourings, caramel and caramel flavourings. Those skilled in the art are familiar with numerous flavourings than can be used.

The invention also provides chocolate and chocolate-like products made according to the process of the invention. The products may have a fat content of at least 26% by weight, preferably at least 27%, most preferably between 28 and 32% by weight.

The listing or discussion of an apparently prior-published document in this specification should not necessarily be taken as an acknowledgement that the document is part of the state of the art or is common general knowledge.

The invention will now be described, by way of non-limiting example only, with reference to the accompanying drawings, in which:

FIG. 1 is a flow diagram schematically showing a process according to the invention; and FIG. 2 is a flow diagram schematically showing a process according to the invention that employs an air classifier mill.

FIG. 1 shows schematically a process for producing milk chocolate according to the invention. Ingredients 1, including cocoa powder (CP), cocoa mass (CM), milk powder (MP) and sugar and, optionally, at least some of cocoa butter (CB), fat and lecithin are mixed in mixer 2. The routes for the optional components are indicated by broken lines. The lecithin and sugar may be at least partially replaced by alternative emulsifiers and sugars or sugar replacers as described above.

After mixing in mixer 2, the mixture is refined in 2-roller and 5-roller refiner 3 to reduce the particle size of the solids. The resulting paste is then passed to homogenizer 4 for homogenization. The ingredients 5 cocoa butter (CB), fat and lecithin may be added to the homogenizer 4.

After homogenization by passage through the homogenizer, the homogenized mixture is passed to conch 6 for conching. Further ingredients are optionally added before or during conching or at end conching. Chocolate 7 is obtained after conching.

The embodiment of the process shown in FIG. 2 comprises an air classifier mill instead of the 5-roller mill. This embodiment of the process has the further advantage of a lower investment cost and of ready adaptation to the production of lower fat products.

In FIG. 2, a milk chocolate is produced according to the invention. Ingredients 8, sugar, cocoa powder (CP) and milk powder (MP), are mixed in mixer 9. After mixing in mixer 9, the mixture passes to air classifier mill 10 in which the particle size of the solids in the mixture is reduced. After milling, the milled mixture passes to homogenizer 11, where further ingredients 12, such as cocoa butter (CB), fat and an emulsifier such as lecithin are added. After homogenization, the mixture passes to conch 13 where it is conched. Part of the further ingredients 12 may be added to conch 13. Chocolate 14 leaves the conch 13. At end conching, the recipe is completed and further ingredients are optionally added.

The following non-limiting examples illustrate the invention and do not limit its scope in any way. In the examples and throughout this specification, all percentages, parts and ratios are by weight unless indicated otherwise.

EXAMPLES

Procedure for Drop-Cone or Gravity Penetrometer

1. Principle

A polished stainless steel cone of a specific weight and an angle will penetrate a specific distance when allowed to free fall for 5 seconds into the product.

2. Apparatus

Drop-cone Penetrometer with hollow cone, brass with hardened stainless steel tip, 102.5 g (such as the Normalab Analis PENETROMETER-MANUAL MODEL-PETROLATUM-941731)

Metal cylindrical cup (approximately 7.5 cm in diameter and 6.0 cm deep).

3. Procedure

Using a spatula, push the paste into the sample cup, taking care not to trap air bubbles or to work the mixture excessively. Strike over the excess paste with the side of a spatula to give a smooth surface. Position the cup under the penetrometer cone. Lower the cone (using the rack adjustor knob) so that it just touches the surface of the paste. Adjust the pointer to zero. Release the cone for a period of 5 seconds. After the cone has been locked in position lower the dial gauge to the new position of the cone shaft and note the reading to the nearest 0.1 mm. The difference between the readings at the beginning and end of the test is recorded as the cone penetrated. Reading divided by 10 equals the penetration value in mm.

Procedure for Determining Particle Size (Fineness) with Micrometer

1. Principle

A small amount of (diluted) product is placed on the measuring surface of the micrometer. By pressing, an indication of the size of the largest non-compressible particles can be received.

2. Material

Micrometer: precision 1 µm.
Solution A: 50% lecithin+50% sunflower oil

3. Sample Preparation

Liquefy the chocolate or semi-finished products and homogenize.
If the product is not liquid (high viscosity, refiner or chocolate powder), add solution A to dilute it:
  fill half a cup with the product (weight=+1-10 gram)
  add 2 ml of the solution A with a plastic syringe
  mix thoroughly during 2 minutes with a spatula until a liquid solution.

4. Procedure

Verification:
  Make sure the surfaces of the micrometer are clean (otherwise clean with paper).
  Slowly rotate the micrometer screw until both surfaces are closed.
  Verify the instrument reads zero when closed.

Measurement:
  Add one or two drops of warm sample on the fixed micrometer surface.
  Slowly rotate the micrometer screw until the ratchet clicks twice.
  Take the reading.
  Clean the surfaces and repeat the measurement three times.
  Make an average of the three readings and express the result in µm.

Example 1

A milk chocolate was produced according to the process of the invention, as depicted in FIG. 1. The following table gives details of the amounts of the components at the different stages of the process:

Example of a milk chocolate

| Milk Chocolate | | % | Fat % At the end of stage |
|---|---|---|---|
| Mixer | Milk powder | 22.5 | 29.2 |
| | Cocoa liquor | 11.6 | |
| | Cocoa butter | 14.0 | |
| | Sugar | 41.7 | |
| Homogeniser | Cocoa butter | 1.8 | 30.6 |
| | Lecithin | 0.02 | |
| End conching | Cocoa butter | 7.7 | 35.7 |
| | Lecithin | 0.7 | |
| Total | | 100 | |
| Casson viscosity mPas | | 980 | |

Full cream milk powder, West African cocoa liquor, cocoa butter and crystal sugar were mixed according the recipe, resulting in a fat content of 29.2%. The mix was refined with a two-roll and a five-roll refiner in order to obtain a fineness of 20 µm. During homogenization, the refiner flakes were homogenised with cocoa butter and lecithin and passed to the conch. The paste after the homogenizer had a temperature of 78° C., corresponding to a temperature rise of 39° C., and a penetration value measured with a manual gravity cone penetrometer of 11.2 mm. Dry conching was performed in a 6 tons three shaft conch for 4 hours and the temperature reached and maintained was 88° C. The paste was plasticized by adding lecithin and cocoa butter according the recipe to obtain a final fat content of 35.7%. The viscosity was measured with a Physica Rotary Viscosimeter and Casson viscosity of 980 mPas and a Casson yield value of 7 Pa.

When presenting sample to a professional taste panel no significant difference with a reference production was found.

Example 2

A milk chocolate was produced according to the process of the invention. The following table gives details of the amounts of the components at the different stages of the process:

Example of a milk chocolate

| Milk Chocolate | | % | Fat % At the end of stage |
|---|---|---|---|
| Mixer | Milk powder | 22.5 | 9.2 |
| | Cocoa powder | 5.9 | |
| | Sugar | 41.7 | |
| Homogeniser | Cocoa butter | 21.5 | 30.6 |
| | Lecithin | 0.02 | |
| End conching | Cocoa butter | 7.7 | 35.7 |
| | Lecithin | 0.7 | |
| Total | | 100 | |
| Casson viscosity mPas | | 1060 | |

Full cream milk powder, natural cocoa powder and crystal sugar were dosed and mixed, in a ribbon mixer, according the recipe. This mix was refined on an air classifier mill from P. M. Duyvis Machinefabriek BV type ICM12 at a rate of about 100 kg per hour in order to obtain a fineness of 18 μm. The refined powder was then homogenized with cocoa butter and soya lecithin in a rotor-stator homogenizer from Lipp Mischtechnik GMBH type R021 with a throughput of 500 kg/h. The resulting product after the homogenizer had a temperature of 72° C. and a penetration value, measured with a manual cone penetrometer, of 10.9 mm. After dry conching for 6 hours in a three-shaft 4 ton conche, with a maximum temperature of 86° C., the mass was liquefied by addition of lecithin and cocoa butter.

The viscosity measurement gave a Casson viscosity of 1060 mPas and a Casson yield value of 7.0 Pa. Methods for determining viscosity are well known to those skilled in the art and include, for example, the method described in the International Office of Cocoa, Chocolate and Sugar Confectionery, IOCCC method 10.

The analytical and taste results of this product gave no significant difference with a reference production performed with the same raw materials.

The invention claimed is:

1. Process for producing a chocolate or chocolate-like product comprising:
   (i) mixing a part of the components of the chocolate or chocolate-like product to form a mixture;
   (ii) homogenizing the mixture with fat, wherein the fat includes added fat, using a rotor/stator homogenizer; and
   (iii) conching the homogenized mixture; and
   wherein:
   a) the weight ratio of (fat present in (i)):(fat added in (ii)):(fat added in (iii)), based on the weight of the total fat in the product, is from (0 to 6):(50 to 90):(10 to 50);
   b) the weight ratio of (fat present in (i)):(fat added in (ii)):(fat added in (iii)), based on the weight of the total fat in the product, is from (6 to 35):(50 to 90):(10 to 50); or
   c) the weight ratio of fat present in the steps (i):(ii):(iii) is (70 to 100): (80 to 100): (90 to 100) based on the weight of the fat in the product.

2. Process according to claim 1, wherein the mixture is refined prior to homogenizing.

3. Process according to claim 2, wherein the mixture is refined using a 5-roller mill.

4. Process according to claim 2, wherein the mixture is refined in a two stage refining step.

5. Process according to claim 4, wherein the two stage refining step comprises a first stage comprising refining using a 2-roller mill and a second stage comprising refining using a 5 roller mill.

6. Process according to claim 2, wherein the mixture is refined by dry milling.

7. Process according to claim 6, wherein the level of fat that is present in (i) is less than 22% by weight based on the weight of the mixture in (i).

8. Process according to claim 6, wherein the weight ratio of (fat present in (i)):(fat added in (ii)):(fat added in (iii)), based on the weight of the total fat in the product, is from (0 to 6):(50 to 90):(10 to 50).

9. Process according to claim 6, wherein the mixture is milled in an air classifier mill prior to homogenizing.

10. Process according to claim 1, wherein the weight ratio of (fat present in (i)):(fat added in (ii)):(fat added in (iii)), based on the weight of the total fat in the product, is from (6 to 35):(50 to 90):(10 to 50).

11. Process according to claim 1, wherein the weight ratio of fat present in the steps (i):(ii):(iii) is (70 to 100): (80 to 100): (90 to 100) based on the weight of the fat in the product.

12. Process according to claim 1, wherein the mixture prior to homogenizing comprises solids having a particle size of less than 80 μm.

13. Process according to claim 1, wherein the components are selected from the group consisting of cocoa based materials, sugars, sugar substitutes, milk powders, fat and mixtures thereof.

14. Process according to claim 13, wherein the cocoa based materials are selected from the group consisting of cocoa powder, cocoa mass, cocoa liquor and mixtures thereof.

15. Process according to claim 1, wherein the homogenizing step is carried out such that a temperature rise of at least 10° C. is achieved in the mixture by mechanical input.

16. Process according to claim 1, wherein the homogenization is carried out to give a mixture with a hardness similar to the hardness resulting from the shear after at least two hour of traditional conching in a double or single shaft conche.

17. Process according to claim 1, wherein the fat in the homogenizing step is selected from the group consisting of cocoa butter, cocoa butter equivalents, butter fat or fractions thereof, palm oil or fractions thereof, coconut or fractions thereof, palm kernel oil or fractions thereof, liquid vegetable oils, interesterified mixtures of the above fats or fractions or hardened components thereof, or mixtures thereof.

18. Process according to claim 1, wherein the homogenizing step is carried out such that the reduction in the mean particle size during homogenization is less than 25%.

19. Process according to claim 1, wherein the homogenizing step is carried out such that the mean particle size does not change significantly during the homogenization step.

20. Process according to claim 1, wherein the conching is carried out using a three shaft shear conch or a one shaft plough shear conch.

21. Process according to claim 1, wherein the conching is carried out at temperature from 50 to 100° C.

22. Process according to claim 1, wherein the conching is carried out for less than 8 hours.

23. The process of claim 1, wherein the process does not comprise a step of extrusion.

24. Process according to claim 23, wherein the mixture is homogenized with cocoa butter added to the mixture, and an emulsifier is added before or during homogenization.

* * * * *